Sept. 14, 1937.  R. S. COULTER  2,093,232
MELTING KETTLE FOR TAR, ASPHALT, AND THE LIKE
Filed June 5, 1936  3 Sheets-Sheet 1

INVENTOR.
RONALD S. COULTER
BY
ATTORNEY.

Sept. 14, 1937.  R. S. COULTER  2,093,232
MELTING KETTLE FOR TAR, ASPHALT, AND THE LIKE
Filed June 5, 1936  3 Sheets-Sheet 2

INVENTOR.
RONALD S. COULTER
BY
ATTORNEY.

Sept. 14, 1937.  R. S. COULTER  2,093,232
MELTING KETTLE FOR TAR, ASPHALT, AND THE LIKE
Filed June 5, 1936  3 Sheets-Sheet 3
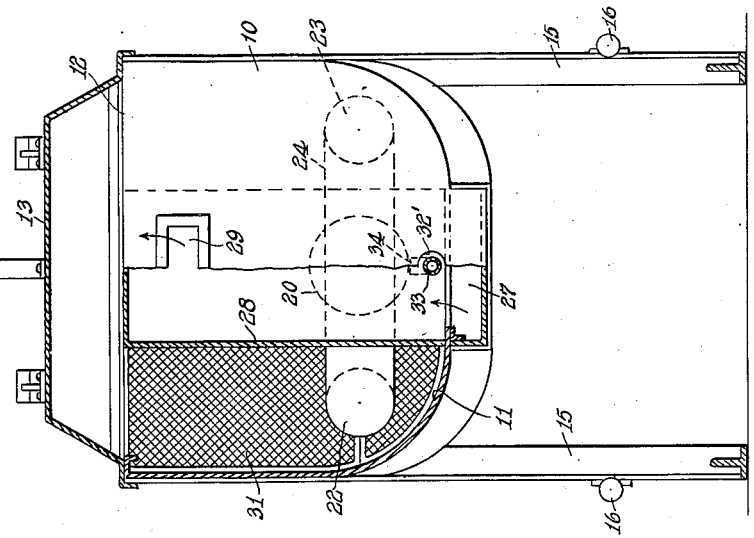
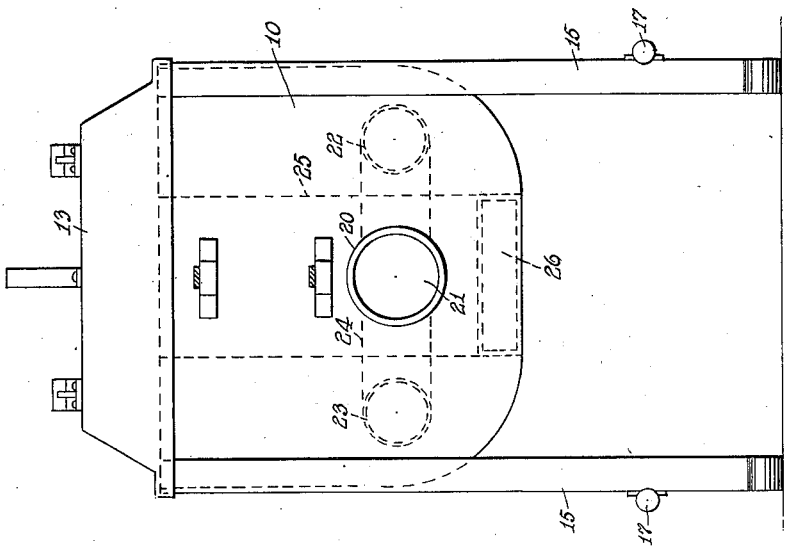
INVENTOR.
RONALD S. COULTER
BY
ATTORNEY.

Patented Sept. 14, 1937

2,093,232

UNITED STATES PATENT OFFICE 2,093,232

MELTING KETTLE FOR TAR, ASPHALT, AND THE LIKE

Ronald S. Coulter, Roselle Park, N. J., assignor to Hauck Manufacturing Company, Brooklyn, N. Y., a corporation of New York Application June 5, 1936, Serial No. 83,641

5 Claims. (Cl. 126—343.5)

The invention relates to melting apparatus, more particularly to melting kettles for tar, asphalt and the like, and such as are designed usually for highway maintenance, paving, roofing and waterproofing and like operations.

It has for an object the provision of a kettle of this type which may be operated at high thermal efficiency and wherein the material may be more rapidly and effectively heated and melted than in kettles as ordinarily constructed; also, to so construct a kettle that coking due generally to overheating of the kettle bottom is minimized and accumulation of foreign matter thereon substantially obviated, thereby affording a kettle giving longer and more uniform service.

A further object of the invention is to avoid ignition of heated vapors arising from the more or less liquefied mass through discharge of the spent heating gases; also, to maintain at the same time a suitable temperature at the outlet end of the kettle so that the molten material may readily be dispensed through a suitable outlet nozzle.

Still another object of the invention resides in the provision of a heating zone longitudinally of the kettle and beneath the bottom thereof; also, to so construct the same that it may conveniently be detached as for cleaning of any accumulated deposits.

These objects are attained in the novel construction which embodies a suitably shaped receptacle or kettle open at the top for loading of the material to be melted but provided with suitable lids for closing the kettle during the melting operation.

There is retained within this kettle a specially designed heating flue which becomes substantially immersed as a whole in the molten material, and this flue terminates at the burner end within the kettle in a U-shaped header or manifold from which the collected heated gases are delivered to a further flue extending longitudinally of the kettle but located beneath the bottom thereof.

This longitudinal flue, in turn, is extended upwardly through the bottom and is provided near the top of the kettle with a discharge opening for disposal of the spent gases. Moreover, the melted material discharge pipe from the bottom of the kettle is arranged to pass through this discharge flue, whereby the outgoing melted material is maintained in a sufficiently fluid state at the point of discharge for ready dispensing; and an auxiliary discharge outlet for spent gases is provided about the spigot of the discharge pipe to further maintain fluidity to the actual point of discharge. The provision of the flue beneath the bottom of the kettle, together with a drain arrangement in connection with the discharge of the material insures that the kettle may be completely drained and caking and accumulation of material on the bottom obviated upon shutting down of the apparatus.

The nature of the invention, however, will best be understood when described in connection with the accompanying drawings, in which:

Fig. 3 is a vertical section taken on the line 3—3, Fig. 1 of the drawings, and looking in the direction of the arrows.

Fig. 4 is a front elevation and part transverse section of the novel kettle.

Figure 1:
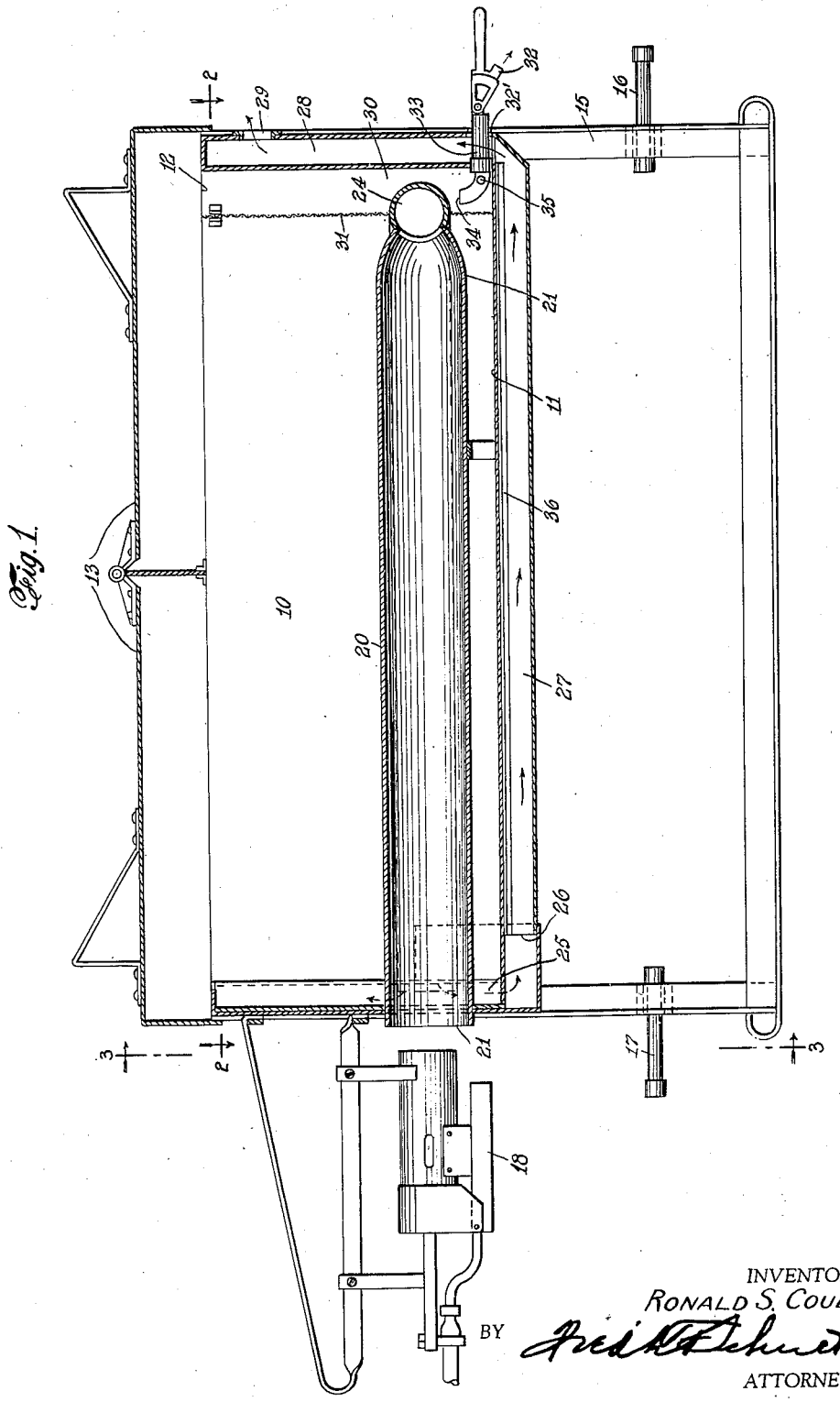
Fig. 1 is a vertical section taken through the novel melting kettle.
Figure 2:
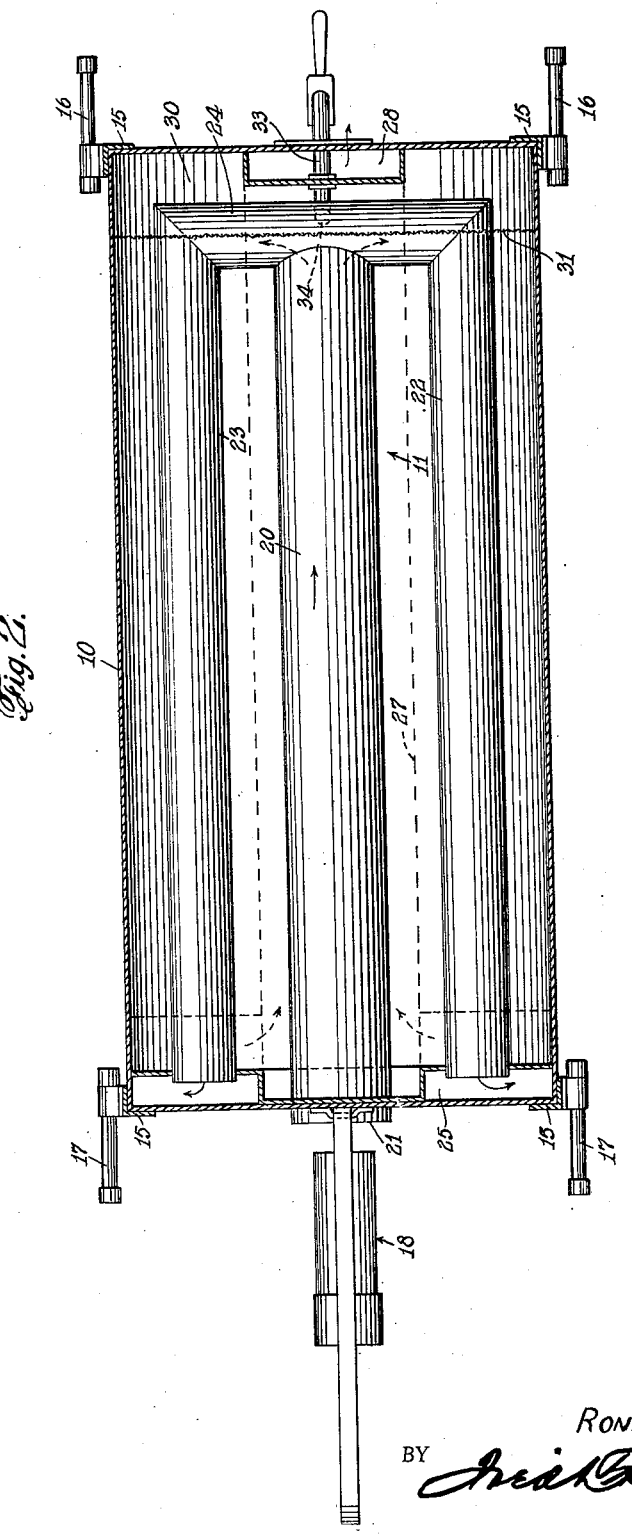
Fig. 2 is a horizontal section therethrough taken on the line 2—2, Fig. 1 of the drawings, and looking in the direction of the arrows.

Referring to the drawings, 10 designates a metal shell or more or less elongated receptacle with rounded bottom 11 and open at the top 12. This top, however, is designed to be closed by means, for example, of a pair of hinged lids or covers 13 which are closed after filling of the receptacle with material to be melted. The kettle is mounted upon a suitable frame-work 15 which may be provided with pairs of handles 16 and 17 at its opposite ends for manually transporting the same from place to place, as required; or wheels, or like means (not shown), may be applied thereto.

The frame 15 is designed also to carry a suitable burner apparatus indicated at 18 for providing flame and heated gases not directly into the kettle or receptacle, as is the usual practice, but into an immersed melting member embodying the longitudinally extending flue member 20 which is located near the bottom of the kettle and extends substantially from end to end with the near end provided with an opening 21 juxtaposed to the outlet of burner 18. At the far end, the flue divides into two arms 22 and 23 through a T-connection 24; and the said arms 22 and 23 parallel the flue portion 20 to the burner end of the kettle. At this end, they terminate in a U-shaped header or tube sheet 25 which, in turn, communicates through the opening 26 with a further and discharge flue 27 located beneath the bottom 11 of the kettle where the circulation of molten material has a tendency to become sluggish. At the far end of the kettle, flue 27 passes through the bottom thereof being turned upwardly substantially to the top of the same and provided with a discharge portion 28 from which the spent gases are delivered into the atmosphere through outlet 29.

A discharge chamber 30 for the molten material is provided at the far end of the kettle and a screen 31 is preferably located in advance of the outlet spigot 32 which, as is indicated in the drawings, is located near the bottom of the kettle and embodies a pipe portion 33 passing through the discharge portion of the outlet flue. Its inner end may be constituted as a removable elbow member with upper opening 34 substantially at the level of the bottom of the submerged flues and with an additional or drain opening 35 at the bottom of the elbow substantially at the level of the tank bottom. An auxiliary spent gas discharge outlet 32' is provided in the flue 28 and kettle wall about pipe portion 33 to assist in maintaining the spigot 32 at the required temperature. This will insure not only a suitable temperature of the spigot and portion of the kettle in the vicinity thereof so that rapid and satisfactory discharge of the molten material is had, but that no difficulty will be experienced in the manipulation of the spigot member.

Moreover, in the provision of the discharge flue beneath the normally colder zone along the kettle bottom, flow of the material will better be maintained and it may be substantially drained from the tank; or, if there be any accumulation, this will rapidly be melted at starting of the melting operation so that a rapid melt is attained and molten material is quickly available. This external flue portion located beneath the kettle bottom is preferably made to be readily removable therefrom for cleaning purposes; and to this end, it may be constructed as a box plate to be inserted at one end into the header outlet 26 and attached by bolts and nuts (not shown), for example, to angle pieces 36 extending longitudinally over the bottom of the kettle.

I claim:

1. A melting kettle for tar, asphalt and the like, comprising a receptacle provided with an opening at the top to receive the material to be melted, a heating flue mounted within the kettle for immersion in the molten material and comprising a duct with opening at one end and said duct extending longitudinally through the kettle near the bottom thereof and affording a pair of return flues in communication therewith, a burner to introduce a heating medium into the opening of said longitudinal duct, a header within the kettle at the burner end and in which said return flues terminate, and a discharge flue extending longitudinally along and beneath the bottom of the kettle to its discharge end, communicating with said header and having an outlet to the atmosphere at said discharge end.

2. A melting kettle for tar, asphalt and the like, comprising a receptacle provided with an opening at the top to receive the material to be melted, a heating flue mounted within the kettle for immersion in the molten material and comprising a duct with opening at one end and said duct extending longitudinally through the kettle near the bottom thereof and affording a pair of return flues in communication therewith, a burner to introduce a heating medium into the opening of said longitudinal duct, a U-shaped header extending downwardly below the bottom of the kettle at the burner end and in which said return flues terminate, and a discharge flue communicating with the bottom of the header and extending longitudinally along and beneath the bottom of the kettle.

3. A melting kettle for tar, asphalt and the like, comprising a receptacle provided with an opening at the top to receive the material to be melted, a heating flue mounted within the kettle for immersion in the molten material and comprising a duct with opening at one end and said duct extending longitudinally through the kettle near the bottom thereof and affording a pair of return flues in communication therewith, a burner to introduce a heating medium into the opening of said longitudinal duct, a U-shaped header extending downwardly below the bottom of the kettle at the burner end and in which said return flues terminate, and a discharge flue communicating with the bottom of the header, removably attached thereto and extending longitudinally along and beneath the bottom of the kettle.

4. A melting kettle for tar, asphalt and the like, comprising a receptacle provided with an opening at the top to receive the material to be melted, a heating flue mounted within the kettle for immersion in the molten material and comprising a duct with opening at one end and said duct extending longitudinally through the kettle near the bottom thereof and affording a pair of return flues in communication therewith, a burner to introduce a heating medium into the opening of said longitudinal duct, a header within the kettle at the burner end and in which said return flues terminate, a discharge flue extending longitudinally along and beneath the bottom of the kettle to its discharge end, communicating with said header and having an outlet to the atmosphere at said discharge end, and means for discharging molten material from the bottom of the kettle and embodying a pipe extending through said discharge flue, there being a further discharge outlet from the discharge flue and about said discharge pipe.

5. A melting kettle for tar, asphalt and the like, comprising a receptacle provided with an opening at the top to receive the material to be melted, a heating flue mounted within the kettle for immersion in the molten material and comprising a duct with opening at one end and said duct extending longitudinally through the kettle near the bottom thereof and affording a pair of return flues in communication therewith, a burner to introduce a heating medium into the opening of said longitudinal duct, a header within the kettle at the burner end and in which said return flues terminate, and a discharge flue extending longitudinally along and beneath the bottom of the kettle to its discharge end, communicating with said header and having an outlet to the atmosphere at said discharge end, said kettle being provided with a discharge chamber at its far end through which an upward extension of the discharge flue extends, and discharge means for molten material and including a pipe communicating with said chamber and extending through said discharge flue.

RONALD S. COULTER.